Figure 1:
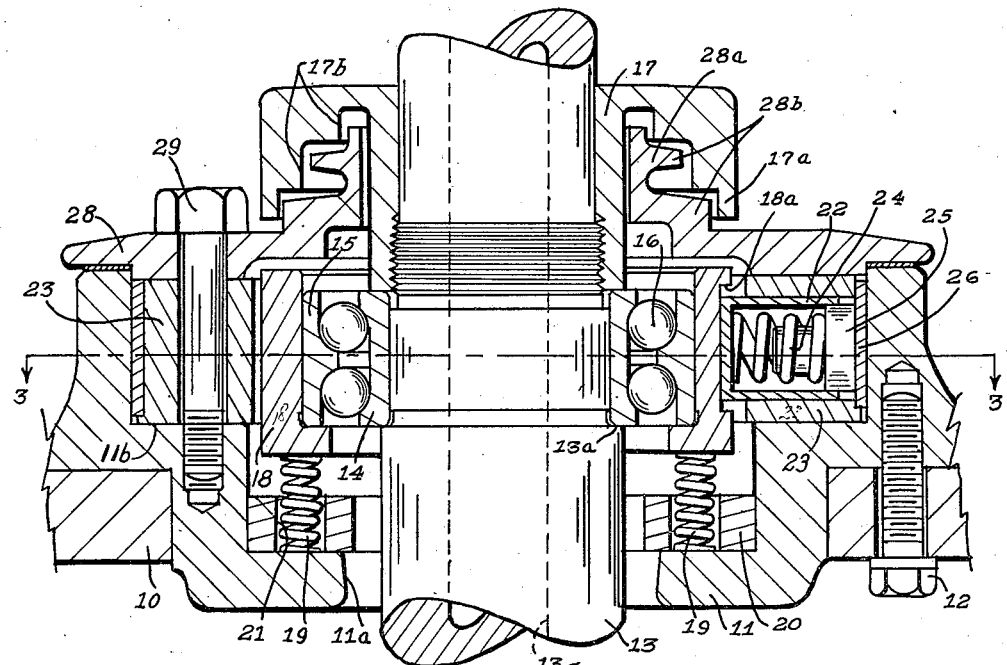

June 12, 1951     J. E. COOK     2,556,317
BEARING ASSEMBLY FOR CENTRIFUGES AND THE LIKE Filed April 6, 1948     2 Sheets-Sheet 1

INVENTOR
JAMES E. COOK
BY Davis, Hoxie & Faithfull
ATTORNEYS

June 12, 1951     J. E. COOK     2,556,317
BEARING ASSEMBLY FOR CENTRIFUGES AND THE LIKE
Filed April 6, 1948     2 Sheets-Sheet 2

INVENTOR
JAMES E. COOK
BY
Davis, Hoxie & Faithfull
ATTORNEYS

Patented June 12, 1951

2,556,317

UNITED STATES PATENT OFFICE 2,556,317

BEARING ASSEMBLY FOR CENTRIFUGES
AND THE LIKE

James Edward Cook, Poughkeepsie, N. Y., assignor to The De Laval Separator Company, New York, N. Y., a corporation of New Jersey Application April 6, 1948, Serial No. 19,336

8 Claims. (Cl. 308—143)

This invention relates to spindle bearings for centrifuges, and the like. More particularly, the invention has reference to an improved bearing assembly for resiliently supporting the spindle of the centrifugal bowl so as to accommodate and absorb vibrations incident to its rotation.

In centrifuges as commonly made heretofore, the spindle supports the centrifugal bowl and, in turn, is supported by both top and bottom bearings. The bottom bearing takes up the axial thrust of the spindle, while the top bearing serves only as a lateral support for the spindle. Since the rotating parts necessarily undergo lateral or radial movements as they are brought up to their normal speed, and even while rotating at the intended speed, the top bearing includes vibration absorbing means arranged radially between the bearing element proper and the stationary frame of the machine. The vibration absorbing means are generally in the form of a rubber cushion or radial compression springs disposed around the bearing element and seated in the stationary frame.

The present invention is directed to the provision of an improved bearing assembly for the spindle of a centrifuge, or the like, in which both the lateral and the axial support for the spindle are resilient, whereby the assembly absorbs lateral vibrations of the spindle and also changes in the magnitude of its axial thrust during the rotation.

A bearing assembly made according to the invention comprises a bearing element proper, such as a ball bearing, engaging and surrounding the spindle and locked against axial movement relative to the spindle. The bearing element, in turn, is mounted on one or more compression springs preferably disposed below the bearing element and seated upon a stationary flange of the centrifuge frame surrounding the spindle. The compression springs support the spindle in axial thrust and are adapted to flex laterally to accommodate lateral movements of the spindle. In addition, the bearing element is supported laterally or radially by resilient means which may be in the form of radial compression springs seated at their outer ends against a stationary part of the frame, the latter springs exerting a radial thrust toward the spindle axis and against the bearing element. The radial and axial springs, and the bearing element which they support, may be arranged in a recess in the stationary frame and normally closed by a cover which may be easily removed to obtain access to the bearing parts.

The spindle is also supported by a second bearing element spaced axially from the first. Preferably, the second bearing element is located near the lower end of the spindle and affords only lateral support thereto, this bearing element allowing axial movement of the spindle incident to contraction and expansion of the axial springs of the upper bearing. Thus, the spindle and its centrifugal bowl "float" on the latter springs, and the lateral vibratory movements are cushioned by the radial springs of the upper bearing. The lower bearing element provides the desired stability to the rotating parts and restricts lateral movements of the lower end of the spindle, which is particularly important when the latter serves as a duct and is connected through a flexible seal to a stationary pipe.

Figure 2:
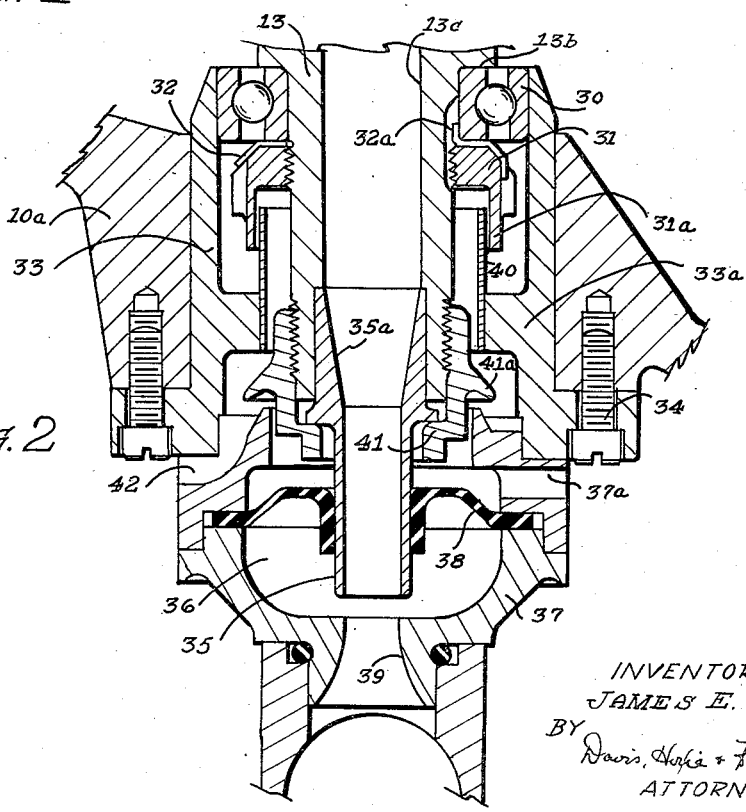
Figure 3:
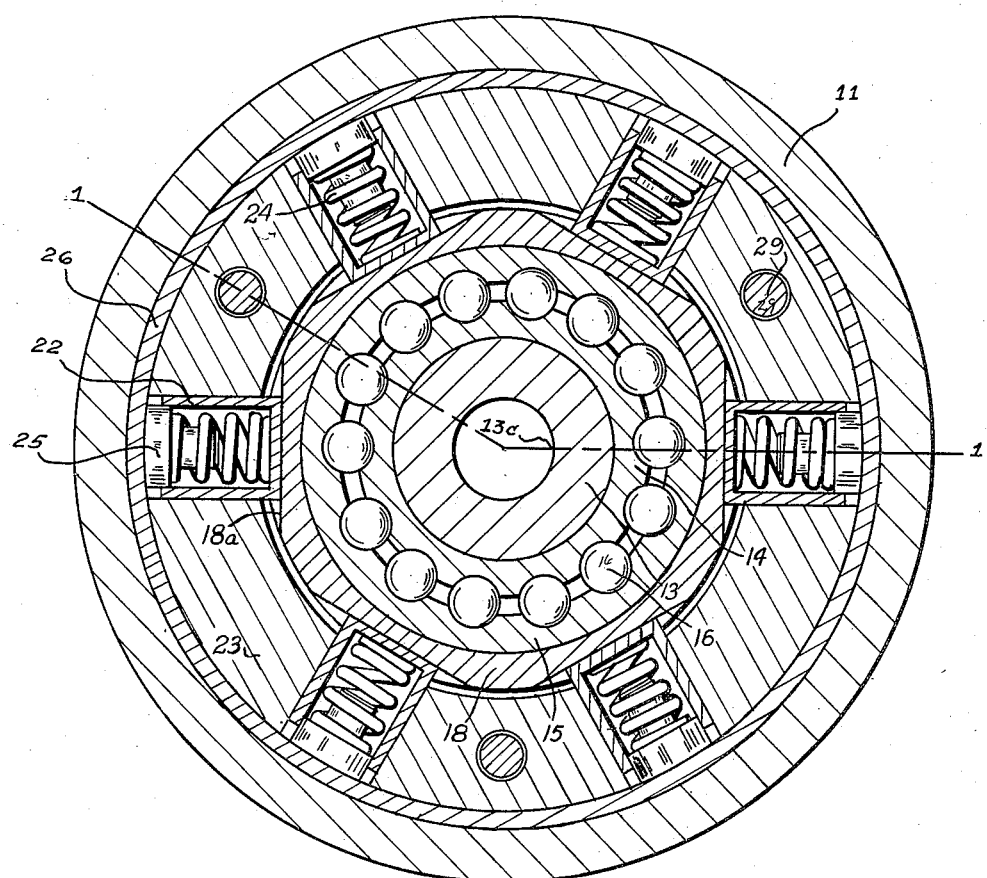

For a better understanding of the invention, reference may be had to the accompanying drawing, in which Fig. 1 is a vertical sectional view of part of a centrifuge embodying one form of the invention, showing the mounting for the bearing element at the upper part of the spindle, the view being on the line 1—1 in Fig. 3;

Fig. 2 is a vertical sectional view of the lower part of the spindle, showing the mounting for the lower bearing element, and Fig. 3 is a sectional view on the line 3—3 in Fig. 1.

Referring to the drawing, the numeral 10 designates a horizontal flange forming part of the stationary frame of the centrifuge. The flange 10 has a central opening into which the lower part of a stationary housing 11 is closely fitted, the housing 11 resting upon the flange 10 and being removably secured thereto by bolts 12. At its lower end, the housing 11 has a central opening 11a through which the vertical spindle 13 of the centrifuge extends with a substantial clearance.

The spindle is rotatably supported in a bearing element having an inner race 14 fitted closely around the upper part of the spindle and seated on an upwardly facing shoulder 13a of the spindle. The inner race 14 is surrounded by an outer race 15 and by ball bearings 16 interposed between the two races. It will be observed that the bearing 14, 15, 16 is adapted, through the outer race 15, to support the spindle in axial thrust and also radially. The inner race 14 is clamped against the spindle shoulder 13a by a nut 17 threaded on the spindle directly above the bearing, the nut 17 having a hood 17a for a purpose to be described presently. The outer race 15 is held closely in a movable supporting ring 18 having at its lower end an inwardly extending flange upon which the outer race 15 rests.

The supporting ring 18 is supported axially by a spring arrangement which, as shown, comprises a series of vertical compression springs 19 interposed between the bottom of the supporting ring 18 and the bottom flange of the housing 11. The springs 19 are spaced apart around the spindle and are positioned at their lower ends by a locating ring 20 resting upon the bottom flange of the housing 11. The locating ring 20 is held in position by the side wall of housing 11 and has holes 21 for receiving the lower portions of springs 19. Since the upper end portions of springs 19 project above the locating ring 20, these springs are adapted to flex laterally to accommodate radial movements of the spindle and the bearing element.

Radial plungers 22 are spaced around the supporting ring 18, the inner end of each plunger being seated in a recess 18$^a$ in the supporting ring. The recess 18$^a$ is large enough to allow axial movement of supporting ring 18 relative to the plunger in the recess. The plungers 22 are generally cup-shaped with their open ends facing outwardly. Each plunger is slidable radially in holes formed in a ring 23 mounted on an upper ledge 11$^b$ in the housing 11. Within each plunger 22 is a compression spring 24, the inner end of which presses against the closed end of the plunger, while the outer end of the spring is seated against the head of a pin 25. Each pin 25 extends partly within the coils of the spring to center the latter and is pressed by the spring against a ring 26 engaging the inner wall of housing 11 near the top of the housing.

The top of the housing 11 is normally closed by a cover plate 28 removably secured to the housing, as by means of bolts 29 extending through the cover and through openings in the plunger ring 23, the lower end of each bolt 29 being threaded into the housing 11. At its inner portion, the cover 28 has a hollow boss 28$^a$ projecting upwardly within the hood 17$^a$, the boss 28$^a$ being spaced from the nut 17 and its hood 17$^a$. As shown, the interior of the hood 17$^a$ is provided with steps 17$^b$ which increase in diameter toward the bottom of the hood, and the boss 28$^a$ of the cover plate has external steps 28$^b$ conforming generally to the steps 17$^b$. Thus, the boss 28$^a$ and the surrounding hood 17$^a$ cooperate to provide a baffle arrangement by which air can circulate through the bearing assembly without admitting foreign particles.

The lower end of spindle 13 is supported laterally by a ball bearing 30 closely surrounding the spindle. As shown, the inner race of the lower bearing is secured to the spindle by a nut 31 which is threaded on the spindle below the bearing 30 and clamps the latter against a shoulder 13$^b$ of the spindle. The nut 31 is locked in position by a deformable washer 32 having a part 32$^a$ located in a longitudinal groove in the spindle. The outer race of bearing 30 is slidable axially in a sleeve-like housing 33 closely surrounding this bearing, the housing 33 being removably secured in the lower frame part 10$^a$ by bolts 34.

In order to feed liquid to the centrifugal bowl (not shown) on top of the spindle 13, the latter is provided with a central passage 13$^c$ which communicates through a tube 35, secured to the lower end of the spindle, with a chamber 36 in a stationary housing 37 on the frame. The housing 37 is clamped against the bottom of the lower bearing housing 33 and contains a flexible seal 38 closely surrounding the spindle tube 35 and dividing the chamber 36 into two parts. A nozzle opening 39, narrowing upwardly, is formed in the bottom of the lower part of chamber 36 and delivers the feed liquid in a jet into the reduced lower end of the rotating tube 35 spaced above the nozzle, the liquid then flowing upwardly in a divergent stream at 35$^a$ into the spindle passage above the tube 35. Leakage of feed liquid past the seal 38 is discharged from the upper part of chamber 36 through an outlet 37$^a$. Such leakage, however, will normally be insubstantial because of the low pressure in the lower part of chamber 36 due to the Venturi effect of the nozzle 39 and tube 35.

It is desirable to prevent leakage of oil from bearing 30 down into the seal housing 37, because the oil might seep past the seal and contaminate the feed liquid. Accordingly, the housing 33 is provided below the bearing 30 with an internal flange 33$^a$ which closely receives a collar 40 projecting upwardly into a depending hood 31$^a$ on the nut 31, there being a clearance between the collar and the hood. Thus, the parts 31$^a$ and 40 serve to trap the oil leakage from the bearing. Any oil overflowing the collar 40 will be deflected outwardly by an underlying apron 41$^a$ on a nut 41 for securing tube 35 to the spindle, the outwardly deflected oil escaping through a port 42.

The operation of the bearing assembly is as follows: The spindle is supported axially by the vertical compression springs 19 which transmit the downward thrust of the spindle from the upper bearing and the ring 18 to the housing member 11 and the frame 10. The upper part of the spindle is supported laterally by the radial compression springs 24 which transmit the forces incident to radial movements of the spindle to the side wall of housing 11 and thence to the centrifuge frame. In addition, the lower part of the spindle is supported laterally by the bearing 30, which, however, is held against radial movement and is slidable axially in housing 33. When the spindle is rotating, any increase in the axial thrust, such as may occur in filling the centrifugal bowl or discharging separated material therefrom, is absorbed by the vertical springs 19. That is, the springs 19 allow the supporting ring 18, and the bearing and spindle which it supports, to move vertically relative to the frame and the housing 11, so that the spindle "floats" upon the springs 19. Since the inner end of each plunger 22 is somewhat smaller than the recess 18$^a$ which receives it, the supporting ring 18 is adapted to move vertically without damaging the plungers or the radial spring system, the flat inner ends of the plungers merely sliding vertically on the inter-engaging face of the supporting ring 18.

The vertical movements of the spindle, accompanied by expansion and contraction of springs 19, result in a sliding movement of the lower bearing 30 in housing 33. This sliding movement is permitted by the vertical spacing between collar 40 and nut 31, between housing 37 and apron 41$^a$, and between tube 35 and the bottom of chamber 36, the spacing in each case being sufficient to prevent engagement of the rotating parts with the fixed parts in the operation of the centrifuge.

The lateral or radial movements of the upper part of spindle 13 incident to its rotation are absorbed by the radial springs 24, as pointed out above. More particularly, the supporting ring 18 moves radially with the spindle and acts through the opposing plunger or plungers 22 to further compress the corresponding spring or springs 24. The plungers 22 are adapted to slide outwardly a certain distance before they engage the outer ring 26, the amount of this permissible outward movement being sufficient to accommodate the maximum vibrations of the spindle. Of course, any such outward movement of one of the plungers 22 is accompanied by an inward movement of the plunger or plungers at the opposite side of the spindle, due to the expansion of the corresponding springs 24. The radial springs 24 thus impose an increasing and yielding resistance to radial displacements of the spindle. It will be observed that these radial displacements of the spindle may occur without damaging the vertical springs 19, since the upper portions of the latter are free to flex laterally during such displacements.

It will be observed that the bearing 14, 15, 16 and the surrounding ring 18 will move together not only horizontally but vertically as well, because of the inwardly extending flange of ring 18 upon which the outer race of the bearing rests and for the further reason that springs 19 cause this ring to follow any upward movement of the bearing. Thus, the vertical movements of the bearing and the supporting ring 18 are accommodated entirely by the sliding contacts between ring 18 and the plungers 22.

In addition, it will be observed that the small clearance between the nut 17 and the inner surface of cover 28 will limit the lateral movements of the rotating parts in the event of breakage of the upper bearing 14, 15, 16, so as to prevent damage due to contacting of fixed and rotating parts, and in this respect the parts 17 and 28 serve the additional function of a safety bearing.

The lower bearing 30, being held against radial movement, acts more or less as a fulcrum about which the upper part of the spindle can vibrate laterally against the radial springs 24. However, since the bearing 30 is located near the lower end of the spindle, the lateral movements of the lower end are held to a relatively small magnitude. This is particularly advantageous when the lower end of the spindle is engaged by a seal 38, because it reduces distortions of the seal incident to the rotation.

It will be understood that the initial compression in the radial springs 24 is determined by the mass of the rotating parts and by the extent to which it is desired to dampen their radial vibrations. Similarly, the initial compression in the vertical springs 19 is determined by the weight of the assembly which they support and the extent to which it is desired to dampen the vertical vibrations.

When the centrifugal bowl and its spindle 13 are to be lifted from the centrifuge frame, for repair or other purpose, the bolts 12 are removed to release the upper bearing housing 11, so that the latter can be lifted with the spindle. The lower nut 41 is also unscrewed, after removing the housing 37, so that the spindle can be lifted freely from the lower part 10ª of the frame. The upper bearing assembly is readily accessible through the top of housing 11 after the cover 28 is removed.

By using the bearing assembly of the present invention, it is possible to effect a substantial reduction in the height of the spindle as compared with spindles using prior bearing assemblies. Accordingly, the over-all height of the centrifuge may be reduced, which is a distinct advantage.

I claim:

1. A bearing assembly for centrifuge spindles, and the like, which comprises a stationary housing having an opening through which the spindle extends vertically, the spindle being rotatable in the housing and movable laterally in said opening, a bearing in the housing surrounding the spindle, means for securing the bearing to the spindle to prevent axial movement of the spindle relative to the bearing, a supporting ring closely surrounding the bearing and having a surface on which the bearing is seated, a plurality of axial spindle-supporting springs seated on the bottom of the housing around said opening and engaging the bottom of said ring to support the bearing and spindle, the axial springs being compressed by the spindle and bearing in a direction generally parallel to the spindle axis and acting to transmit the axial thrust of the spindle to the housing, and radial spring means in the housing disposed around the bearing and held compressed against the side wall of said ring by the housing in a generally radial direction with respect to the spindle, said radial spring means imposing a yielding resistance to lateral movement of the bearing and the spindle.

2. A bearing assembly according to claim 1, comprising also a ring on the bottom of the housing for locating the axial supporting springs, the axial supporting springs projecting above said ring, whereby the upper portions of the axial supporting springs are free to flex radially to accommodate lateral movements of the bearing.

3. A bearing assembly according to claim 1, comprising also a ring surrounding the bearing and having radial holes receiving said radial spring means, said last ring being seated in the housing on a ledge therein located above the level of the axial supporting springs and outwardly therefrom.

4. In a centrifuge, or the like, having a vertical spindle rotatable in a frame, the combination of a bearing closely surrounding the spindle near one end thereof and adapted to support the spindle both radially and in axial thrust, radial spring means disposed around the bearing and compressed between the bearing and the frame, the adjacent end portion of the spindle being movable radially relative to the frame against the action of said means, an axial spindle-supporting spring below the bearing and compressed between the bearing and the frame to support the bearing and spindle thereon, the spindle being movable axially on said axial supporting spring relative to the frame, a second bearing closely surrounding the spindle near the opposite end thereof, and means for retaining said last bearing against radial movement while accommodating said axial movement of the spindle.

5. A bearing assembly for centrifuge spindles, and the like, which comprises a stationary housing having an opening through which the spindle extends, the spindle being rotatable in the housing and movable laterally in said opening, a bearing in the housing surrounding the spindle, a nut threaded on the spindle to lock the same against axial movement relative to the bearing, an axial spindle-supporting spring in the housing carrying the bearing and spindle and compressed thereby in a direction generally parallel to the spindle axis, whereby the spring transmits the axial thrust of the bearing and spindle to the housing, radial spring means in the housing disposed around the bearing and compressed between the bearing and the housing in a generally radial direction with respect to the spindle, said radial spring means imposing a yielding resistance to lateral movement of the bearing and the spindle, and a removable cover plate on the housing, said plate having a central opening through which the spindle extends with a clearance and also having an upwardly extending boss, said nut having a hood extending downwardly around said boss and forming therewith a baffle passage communicating with the interior of the housing for circulation of air therethrough.

6. A bearing assembly for centrifuge spindles, and the like, which comprises a stationary housing having an opening through which the spindle extends vertically, the spindle being rotatable in the housing and movable laterally in said opening, a bearing in the housing surrounding the spindle, means for securing the bearing to the spindle to prevent axial movement of the spindle relative to the bearing, an axial spindle-supporting spring in the housing carrying the bearing and spindle and compressed thereby in a direction generally parallel to the spindle axis, whereby the spring transmits the axial thrust of the bearing and spindle to the housing, a plurality of radial compression springs in the housing spaced around the bearing and compressed between the bearing and the housing in a generally radial direction with respect to the spindle, and a plunger urged radially inward by each spring toward the bearing, each plunger being movable radially in the housing and having at its inner end a vertical sliding contact with part of the bearing to permit axial movement of the bearing on said axial supporting spring and relative to the plunger, said radial spring means imposing a yielding resistance to lateral movement of the bearing and the spindle.

7. A bearing assembly for centrifuge spindles, and the like, which comprises a stationary housing having an opening through which the spindle extends vertically, the spindle being rotatable in the housing and movable laterally in said opening, a bearing in the housing surrounding the spindle, means for securing the bearing to the spindle to prevent axial movement of the spindle relative to the bearing, an axial spindle-supporting spring in the housing carrying the bearing and spindle and compressed thereby in a direction generally parallel to the spindle axis, whereby the spring transmits the axial thrust of the bearing and spindle to the housing, radial spring means in the housing disposed around the bearing and compressed between the bearing and the housing in a generally radial direction with respect to the spindle, said radial spring means imposing a yielding resistance to lateral movement of the bearing and the spindle, a frame supporting said housing near the upper end of the spindle, a second bearing surrounding the spindle near the lower end thereof and in which the spindle is movable axially, and means on the frame securing said last bearing against lateral movement.

8. A bearing assembly for centrifuge spindles, and the like, which comprises a stationary housing having an opening through which the spindle extends vertically, the spindle being rotatable in the housing and movable laterally in said opening, a bearing in the housing surrounding the spindle, means for securing the bearing to the spindle to prevent axial movement of the spindle relative to the bearing, an axial spindle-supporting spring in the housing carrying the bearing and spindle and compressed thereby in a direction generally parallel to the spindle axis, whereby the spring transmits the axial thrust of the bearing and spindle to the housing, radial spring means in the housing disposed around the bearing and compressed between the bearing and the housing in a generally radial direction with respect to the spindle, said radial spring means imposing a yielding resistance to lateral movement of the bearing and the spindle, a frame supporting said housing near the upper end of the spindle, a second bearing surrounding the spindle near the lower end thereof, and a second housing on the frame in which said last bearing is slidable axially and retained against lateral movement.

JAMES E. COOK.

REFERENCES CITED

The following references are of record in the file of this patent:

UNITED STATES PATENTS

| Number | Name | Date |
| --- | --- | --- |
| 1,035,888 | McLeod | Aug. 20, 1912 |
| 1,598,157 | Seibel | Aug. 31, 1926 |
| 2,012,997 | Junkers | Sept. 3, 1935 |

FOREIGN PATENTS

| Number | Country | Date |
| --- | --- | --- |
| 343,420 | Germany | Nov. 1, 1921 |
| 200,452 | Great Britain | July 12, 1923 |